UNITED STATES PATENT OFFICE.

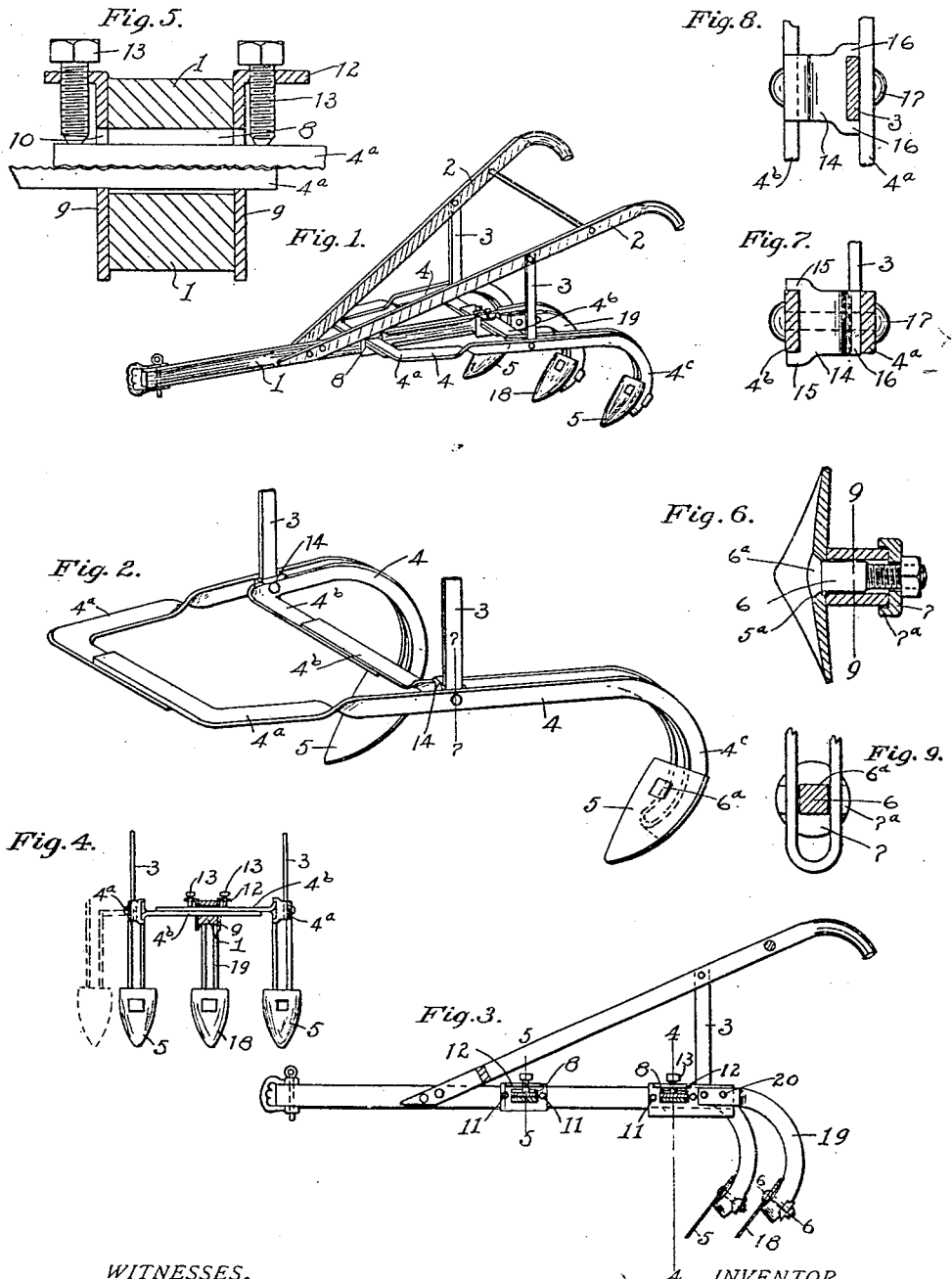

ROBERT M. WARREN, OF BEARDEN, TENNESSEE.

PLOW.

No. 842,280.      Specification of Letters Patent.      Patented Jan. 29, 1907.

Application filed April 4, 1906. Serial No. 309,812.

*To all whom it may concern:*

Be it known that I, ROBERT MARION WARREN, a citizen of the United States, residing at Bearden, in the county of Knox and State of Tennessee, have invented a new and useful Improvement in Plows, of which the following is a specification, reference being had to the accompanying drawings.

My invention relates particularly to plows and cultivators which comprise two or more moldboards, shovels, or similar devices for cutting or turning the ground.

The object of the invention is to provide a simple and efficient construction on which the shovels or moldboards may be moved horizontally toward or from each other and in which an additional moldboard or shovel may be used when desired.

In the accompanying drawings, Figure 1 is a perspective of a cultivator embodying my improvement. Fig. 2 is a perspective of the two main shovel-supports. Fig. 3 is a longitudinal upright section adjacent the beam of the cultivator. Fig. 4 is a section on the line 4 4 of Fig. 3 looking to the right. Fig. 5 is a section on the line 5 5 of Fig. 3 looking to the right. Fig. 6 is a section on the line 6 6 of Fig. 3. Fig. 7 is a section on the line 7 7 of Fig. 2. Fig. 8 is a plan of the portion of the structure illustrated by Fig. 7. Fig. 9 is a section on the line 9 9 of Fig. 6 looking toward the right.

Referring to said drawings, 1 is the beam, and 2 2 are handles attached by their front ends to the sides of the beam and supported between their ends by braces 3. At each side of the beam is located a shovel-supporting member 4. Each such member is formed by folding a bar of metal upon itself at one side of its middle so that one end of the bar will extend beyond the other end, curving the end of said member opposite the ends of the bar downward to form a leg $4^c$, and bending the longer end of the bar toward the beam to form a forward arm $4^a$ and bending the shorter of said arms toward the beam to form a rear arm $4^b$. The leg $4^c$ is curved so that its forward portion will constitute a a proper seat for the shovel 5. The two portions of the bar which constitute the leg are near enough to each other to fit closely to a bolt 6, extending rearward through the shovel and through a clamping-plate 7. Said plate is preferably provided with a flange $7^a$ at each side of the leg. Said bolt is preferably provided with a polygonal head $6^a$, while the shovel is provided with a correspondingly-shaped aperture $5^a$, so that the shovel cannot turn upon the bolt, and the bolt is preferably provided with flat faces bearing against the adjacent inner walls of the leg to prevent the turning of said bolt. Since said leg is curved, as shown by the drawings, the inclination of the shovel to the surface of the ground may be varied by moving said shovel up or down upon the leg, moving it downward making the shovel lean backward more, and sliding the shovel upward making it stand more nearly erect. As is well known, such changes in inclination change the depth to which the shovel will cut.

The front arms $4^a$ of the shovel-supporting member extend through a horizontal transverse aperture 8 in the beam 1, one of said arms lying on top of the other. At each side of the beam a plate 9, having an aperture 10 corresponding to the aperture 8 in the beam, surrounds said arms $4^a$. Said plates are secured to the beam by horizontal bolts 11 extending through said plates and said beam. The upper edge of each of said plates is extended horizontally to form an ear 12, and through each such ear is threaded an upright set-bolt 13, having its lower end bearing upon the upper arm $4^a$, pressing said arm upon the lower arm $4^a$ and causing the latter to bear upon the plates 9. (See Fig. 5.) The meeting faces of said arms may be roughened or corrugated to facilitate engagement. For the reception of the rear arms $4^b$ the beam is provided with a similar aperture 8 and similar plates 9, bearing similar ears 12 and set-bolts 13, similarly binding said arms.

Making the shovel-supporting member of a single piece avoids necessity for splicing and binding together of parts with bolts to form the leg and the arms by which the leg is attached to the beam. This simplifies and cheapens construction and is an important factor in attaining durability.

Just back of the rear arm $4^b$ the adjacent handle-brace 3 is attached by its lower end to the horizontal portion of the member 4. Said end of said brace may be secured in any suitable manner. The drawings show a form which serves also to bind the adjacent bars of the member 4. In this form the lower end of the brace is laid against the inner face of the outer bar of said member, and a block 14 is placed between the brace and the inner bar of said member and a bolt 17 extended horizontally through said bars, brace, and block for binding said parts together. To attain greater stability, the block 14 may have horizontal lips 15 extending over the edges of the inner of said bars and has upright lips or flanges 16 extending over the lateral edges of the brace 3. For the lateral adjustment of the shovels 5 the set-bolts 13 are loosened and the arms $4^a$ and $4^b$ moved toward or from the beam. In this way the shovel-supporting members may always be kept in the same relation to the beam—either parallel or at the same angle—so that the lateral adjustment of the shovels will not change the angle of the shovels to the line of draft.

A third shovel 18 is shown applied removably midway between the shovels 5 by means of a shovel-leg 19, secured to the rear end of the beam 1. Said leg is formed by folding a relatively short bar of metal upon itself. One end of said bar is laid against one side and the other on the other side of the rear end of the beam, and bolts 20 extend horizontally through said ends and the beam. The rear plates 9 may be extended rearward along the sides of the beam far enough to be penetrated by said bolts 20, such construction reinforcing the beam, as is desirable when the beam is composed of wood.

I claim as my invention—

1. In a plow, the combination with a beam, of two one-piece shovel-supporting members located at opposite sides of the beam and each comprising a shovel-leg and horizontal, transverse front and rear arms overlapping each other, and means for binding said arms adjustably to said beam, substantially as described.

2. In a plow, the combination with a beam, of two one-piece shovel-supporting members located at opposite sides of the beam and each comprising a shovel-leg and horizontal, transverse front and rear arms overlapping each other and extending through the beam, and means for binding said arms adjustably to said beam, substantially as described.

3. In a plow, the combination with a beam having horizontal apertures and reinforcing-plates at said apertures, of two one-piece shovel-supporting members located at opposite sides of the beam and each comprising a shovel-leg and horizontal, transverse front and rear arms overlapping each other and extending through the beam and said plates, and means for binding said arms adjustably to said beam, substantially as described.

4. In a plow, the combination with a beam having horizontal apertures and reinforcing-plates at said apertures, ears on said plates, set-bolts seated in said ears, of two one-piece shovel-supporting members located at opposite sides of the beam and each comprising a shovel-leg and horizontal, transverse front and rear arms overlapping each other and extending through the beam and said plates, substantially as described.

5. In a plow, the combination with a beam having horizontal apertures and reinforcing-plates at said apertures, of two one-piece shovel-supporting members located at opposite sides of the beam and each comprising a shovel-leg and horizontal, transverse front and rear arms overlapping each other and extending through the beam and said plates, means for binding said arms adjustably to said beam, and a third shovel-leg applied to the rear end of said beam by bolts extending through said beam and the plates at said end of the beam, substantially as described.

6. In a plow, the combination with a beam of two shovel-supporting members located at opposite sides of the beam and comprising horizontal, transverse front and rear arms overlapping each other, means for binding said arms adjustably to said beam, blocks, 14, bolts, 17, braces, 3, and handles, 2, substantially as described.

7. In a plow, the combination with a beam, of two shovel-supporting members located at opposite sides of the beam and comprising horizontal, transverse front and rear arms overlapping each other, means for binding said arms adjustably to said beam, blocks, 14, having lips, 15 and 16, bolts, 17, braces, 3, and handles, 2, substantially as described.

8. In a plow, the combination with a beam, of two one-piece shovel-supporting members located at opposite sides of the beam and each consisting of a single bar folded upon itself, each member comprising a shovel-leg and the ends of said bar extending sidewise to constitute arms, the arms of one member overlapping the arms of the other member, and means for binding said arms to the beam, substantially as described.

In testimony whereof I have signed my name, in presence of two witnesses, this 27th day of March, in the year 1906.

ROBERT M. WARREN.

Witnesses:
C. A. MORSE,
CYRUS KEHR.